United States Patent Office 3,461,181
Patented Aug. 12, 1969

3,461,181
PROCESS FOR HYDROGENATION
Masaki Sato and Tadashi Miyata, Kamakura-shi, Japan, assignors to Toyo Rayon Kabushiki Kaisha, Tokyo, Japan, a corporation of Japan
No Drawing. Filed Jan. 25, 1967, Ser. No. 611,582
Claims priority, application Japan, Jan. 27, 1966, 41/4,315; Nov. 4, 1966, 41/72,356, 41/72,358
Int. Cl. C07c 5/10, 5/14
U.S. Cl. 260—667      6 Claims

ABSTRACT OF THE DISCLOSURE

A process for hydrogenating a nucleus of an aromatic compound, which comprises contacting the aromatic compound e.g. benzene and hydrogen with a novel hydrogenating catalyst at a temperature of 50–300° C. The catalyst comprising 2–60% by weight of Ni, Fe, Co, or Cu, 2–80% by weight of sodium fluoride or fluoride of alkaline earth metal, and 12–96% by weight of silica or alumina.

---

This invention relates to a novel process for hydrogenating an aromatic nucleus.

Heretofore, as a process for hydrogenating a nucleus of an aromatic compound, many processes such as a reducing process using a noble metal such as palladium, platinum and so forth and a Raney catalyst have been known. Many of such known catalysts for hydrogenation, however, have shortcomings in economy and easiness to handle, and development of a novel catalyst for hydrogenation has been wanted.

An object of this invention is to provide a novel process for hydrogenating an aromatic nucleus capable of hydrogenating a nucleus of an aromatic compound at a high yield close to the theoretical yield.

Another object of this invention is to provide a novel catalyst for hydrogenation having an extremely long high activity durability, not requiring any such particular operation and consideration required for known catalysts for hydrogenation in manufacture and maintenance.

According to this invention, said objects are achieved by a process for hydrogenating a nucleus of an aromatic compound, characterized by contacting the aromatic compound and hydrogen ($H_2$) with a catalyst containing 20–60% by weight of a metal selected from the group consisting of nickel, iron, cobalt and copper, 2–80% by weight of a metal fluoride selected from the group consisting of sodium fluoride and fluorinated alkaline earth metals and 12–96% by weight of a carrier selected from the group consisting of silica and alumina, at a temperature of 50–300° C. (Hereinafter hydrogen in this invention means molecular hydrogen.)

A novel catalyst used in the process of this invention has composition of 2–60% by weight, preferably 15–40% by weight of said metal component, 2–80% by weight, preferably 5–30% by weight of said fluoride component and 12–96% by weight, preferably 30–80% by weight of said carrier. The catalyst used for the process of this application may be used by adding an additive such as filler to these components.

A carrier of the catalyst in this invention is substantially neutral silica or alumina and with a co-called acidic carrier (pKa in water being about −8) such as $SiO_2$-$Al_2O_3$ type used in the field of cracking of hydrocarbons, a desired object cannot be achieved.

An important characteristic of the catalyst of this invention is that it contains sodium fluoride or a fluorinated alkaline earth metal, and when these fluorides fail to be included, a high activity and activity durability of the catalyst cannot be hoped for. On the other hand, a fluoride of an alkaline earth metal, when lithium fluoride and potassium fluoride are used, activities of the obtained catalysts are very poor and that sodium fluoride only can impart a high activity has been found. As fluorinated alkaline earth metals usable for the object of this invention, beryllium fluoride, magnesium fluoride, calcium fluoride, strontium fluoride and barium fluoride may be cited.

In order to show that in the catalyst of this invention, selection of a metal fluoride is especially important, catalyst of the Ni-MF-$SiO_2$ series each containing 20% by weight of nickel and 24% by weight of a fluoride of various metals (MF) are prepared, activities of these catalysts are comparatively tested under the following reaction conditions, and the following results are obtained.

Reaction temperature: 185–190° C.
Molar ratio of $H_2$ to benzene: 10
Weight of catalyst (W)=0.17–0.19 g.
W/S=0.44–0.48 g. cat. hr./mol

| Metal fluoride: | Specific activity |
|---|---|
| $BaF_2$ | 4.1 |
| NaF | 3.4 |
| $NgF_2$ | 3.0 |
| $SrF_2$ | 2.8 |
| $CaF_2$ | 1.9 |
| LiF | 1.0 |
| KF | 0 |
| None | 1.0 | wherein specific activity is a ratio of reaction rates when the reaction rate in the presence of MF is made 1.0, is a flow speed (mol/hr.) of benzene and W/S is a value corresponding to the contact period.

From the above results it is understood that sodium fluoride and fluorinated alkaline earth metals only can impart high activities.

As a metal component of the catalyst, nickel, iron, cobalt or copper is used.

Preparation of the catalyst of this invention is carried out by a known process for preparing a catalyst of a metal like nickel using silica or alumina as a carrier and generally no particular operation is required upon preparation. As a process for the preparation normally adopted preferably, a process of mixing silica or alumina sol with sodium fluoride of a fluoride of an alkaline earth metal, drying and calcining (as a calcining temperature, 200–600° C. is preferable) the mixture, immersing this calcined mixture in an aqueous solution of a salt of a metal selected from the group consisting of nickel, iron, cobalt and copper to have said carrier mixture support said metal salt, preferably treating said mixture supporting said metal salt with an alkali, thereafter calcining said mixture to convert said metal salt to an oxide, subsequently reducing said oxide with hydrogen may be cited. The catalyst of this invention may be used in any form, however, shaping the same into such small lumps as tablet, pellet, cylinder or die in accordance with the operations known in the field of the art is preferable for the subsequent handling. The average particle size of these catalysts are 1–50 mesh, especially catalysts of 5–20 mesh are effective.

In this invention, as a material aromatic compound, whatever aromatic compound capable of being subjected to a normal hydrogenation reaction is usable, however, an aromatic hydrocarbon having 6–16 carbon atoms is preferable. When these compounds are illustrated, benzene, toluene, xylene, trimethyl benzene, tetramethyl benzene, pentamethyl benzene, ethyl benzene, n-propyl benzene, cumene, n-butyl benzene, t-butyl benzene, p-cymene, 1,3,5-triethyl-benzene, styrene, alkyl benzene, diphenyl methane, indene, naphthalene and methyl naphthalene may be cited, of which benzene and an alkyl benzene having 7–15 carbon atoms are especially preferable.

In the process of this invention, the catalyst of said composition is contacted with the aromatic compound and hydrogen at a temperature of 50–300° C., which reaction may be carried out as a contact reaction of a vapor-phase or a vapor (hydrogen)-liquid (aromatic compound) mixed phase. In this case, molar ratio of the aromatic compound to hydrogen is preferably made 1:3–20, especially 1:5–10. The reaction conditions such as temperature, pressure and contact period considerably varying depending upon the material aromatic compound and kind of catalysts, combination thereof may be easily decided empirically in accordance with individual occasions. However, generally speaking, it is preferable to make the reaction pressure from atmospheric pressure to 100 kg./cm.$^2$, especially from atmospheric pressure to 40 kg./cm.$^2$ and make the reaction temperature 100–280° C.

The contact period of the catalyst with the aromatic compound and hydrogen is preferably 1–50 seconds, especially 5–10 seconds in a vapor-phase contact reaction. A liquid-phase reaction is normally carried out batchwise in an autoclave, therefore, insofar as it is sufficient for completing the reaction, there is no particular limit in the reaction period. And in the reaction system, it is possible to make an inert gas such as nitrogen coexist properly. A liquid-phase reaction proceeds regardless of existence of a reaction medium, however, normally it is preferably carried out in the presence of an organic solvent such as cyclohexane and methyl cyclohexane.

Upon practising this invention, a known apparatus conventionally used for hydrogenation of a hydrocarbon, for instance, a fixed bed or moving bed reaction apparatus may be used and the operation may be carried out batchwise or continuously.

Thus, according to the process of this invention, as will be apparent from examples to be mentioned later, by using a three-component catalyst consisting of a neutral carrier, a fluoride of a specific metal and a specific metal component for hydrogenation of a nucleus of an aromatic compound, it is possible to hydrogenate the aromatic nucleus at a high yield close to the theoretical yield.

In addition, the catalyst of this invention selecting said three components as the catalyst components, upon producing the catalyst, there is an advantage that particular attentions required upon producing the conventional catalyst for hydrogenation becomes unnecessary and no particular attention is required for maintenance of the catalyst, as a result it becomes possible to carry out practice of the catalyst more economically as compared with known catalyst for hydrogenation.

Moreover, because the catalyst of this invention is excellent in poison resistance to a sulfur component, it is recognized that the catalyst maintains a high activity for a long period.

Next, this invention will be explained with reference to examples.

Example 1

To 1500 grams of silica sol (of which SiO$_2$ being 334 grams), 200 grams of sodium fluoride were added and the mixture was gelated at room temperature, said gel was dried at 100° C. for 8 hours, calcined at 500° C. for 5 hours, the calcined mixture was made to support an aqueous solution of nickel nitrate by an impregnation method, the mixture was further treated by an aqueous solution of sodium carbonate, well washed with water, dried at 100° C. for 8 hours and calcined at 500° C. for 5 hours. Thirty grams of the so prepared NiO-NaF-SiO$_2$ catalyst (NaF content being 34% by weight, Ni content being 10% by weight) having a particle size of 6–12 mesh was reduced in a reaction tube at 450° C. with hydrogen flow speed of 18 liters/hr. for 8 hours to obtain a Ni-NaF-SiO$_2$ catalyst. Using said catalyst, a reaction was carried out at an average reaction temperature of 150° C. with a benzene flow speed of 19.1 grams/hr. and a hydrogen flow speed of 6.08 liters/hr., accordingly, at a hydrogen to benzene molar ratio of 4.6 and for a contact period of 8.5 seconds. Conversion and yield of the produced cyclohexane were 100% and change of activity of the catalyst could not be recognized after 1000 hours. In this case, when a Ni-SiO$_2$ catalyst failing to contain NaF was used and the reaction was carried out under the same condition, conversion of the produced cyclohexane was 35% and activity of the catalyst was almost lost after 4 hours.

Example 2

Except NaF content was 13.7% by weight and Ni content was 5.0% by weight, using 30 grams of a Ni-NaF-SiO$_2$ catalyst having a particle size of 6–12 mesh prepared same as in Example 1 and the reaction was carried out under the same condition as in Example 1, as a result conversion and yield of the produced cyclohexane was 100%.

Example 3

Using 20 grams of the catalyst same as used in Example 2, a reaction was carried out at an average reaction temperature of 110° C. with a benzene flow speed of 19.1 grams/hr. and a hydrogen flow speed of 6.08 liters/hr., accordingly, at a hydrogen to benzene molar ratio of 4.6 for a contact period of 7.0 seconds. Conversion and yield of the produced cyclohexane were 100%.

Example 4

Starting from alumina sol, magnesium fluoride and nickel nitrate, using 30 grams of a Ni-MgF$_2$-Al$_2$O catalyst (MgF$_2$ content being 10% by weight, Ni content being 10% by weight) having a particle size of 6–12 mesh prepared as in Example 1, hydrogenation of toluene was carried out under the same conditions as in Example 1. As a result, conversion and yield of the produced methylcyclohexane were 100%.

Example 5

Using 30 grams of the catalyst used in Example 1, hydrogenation of ethylbenzene was carried out at an average reaction temperature of 200° C. at a hydrogen to ethylbenzene molar ratio of 8, and a hydrogenation ratio was 100%.

Example 6

To 1500 grams of silica sol (of which SiO$_2$ content being 300 grams), 128 grams of sodium fluoride were added, the mixture was gelated at room temperature, the gel was dried at 100° C. for 8 hours, calcined at 500° C. for 5 hours, the calcined mixture was made to support an aqueous solution of nickel nitrate by an impregnation method, further treated with an aqueous solution of sodium carbonate, washed well with water, thereafter said mixture was dried at 100° C. for 8 hours. 5.0 grams of the so obtained basic nickel carbonate-NaF-SiO$_2$ catalyst (NaF content being 24% by weight, Ni content being 20% by weight) were reduced for 8 hours in an autoclave having an internal capacity of about 700 cc. at a temperature in the vicinity of 400° C. with a hydrogen flow speed of 18 liters/hr. to obtain a Ni-NaF-SiO$_2$ catalyst, to which catalyst 100 cc. of benzene were added and a reaction was carried out under a hydrogen pressure of 40 kg./cm.$^2$ (constant pressure) at a reaction temperature of 180° C. by shaking the autoclave, and 25 minutes after the reaction was started conversion of the produced cyclohexane was above 99.9% and yield thereof was 100%.

Example 7

Inside an autoclave having an internal capacity of 500 cc., using 5.0 grams of a catalyst prepared and reduced as in Example 6, 48 cc. of benzene were charged, and when a reaction was carried at a reaction temperature of 140° under a hydrogen pressure of 100 kg./cm.$^2$ while adopting a so-called liquid-phase method at constant volume whereby when a hydrogen pressure becomes 40 kg./cm.$^2$ by newly supplying hydrogen, the pressure is made 100 kg./cm.$^2$, 40 minutes after the reaction was started conversion of the produced cyclohexane was above 99.9% and yield thereof was 100%.

Example 8

Inside an autoclave having an internal capacity of 500 cc., using 2.5 grams of catalyst prepared and reduced as in Example 6, 100 cc. of benzene were charged, and a reaction was carried out at a reaction temperature of 210° C. under a nitrogen pressure of 16 kg./cm.$^2$ and a hydrogen pressure of 24 kg./cm.$^2$ while the reaction pressure was kept at 40 kg./cm.$^2$ by supplying hydrogen, and 68 minutes after the reaction was started conversion of the produced cyclohexane was above 99.9% and yield thereof was 100%.

By the above result, it was understood that a low concentration hydrogen gas was sufficiently usable.

Example 9

Inside an autoclave having an internal capacity of 700 cc., using 2.5 grams of a Ni-MgF$_2$-SiO$_2$ catalyst (MgF$_2$ content being 24% by weight, Ni content being 20% by weight) prepared and reduced as in Example 6 except using MgF$_2$ instead of NaF, 100 cc. of benzene were charged and a reaction was carried out at a reaction temperature of 180° C. under the constant hydrogen pressure of 40 kg./cm.$^2$, and 20 minutes after the reaction was started conversion of the produced cyclohexane was above 99.9% and yield thereof was 100%.

Example 10

Inside an autoclave having an internal capacity of 700 cc., using 2.5 grams of a Ni-BaF$_2$-SiO$_2$ catalyst (BaF$_2$ content being 15% by weight, Ni content being 50% by weight) prepared and reduced as in Example 6 except using BaF$_2$ instead of NaF, 20 cc. of benzene were charged, and when a reaction was carried out at a reaction temperature of 100° C. under the constant hydrogen pressure of 40 kg./cm.$^2$, 90 minutes after the reaction was started conversion of the produced cyclohexane was above 99.9% and yield thereof was 100%.

Example 11

To 3,500 grams of silica sol (of which BiF$_2$ being 700 grams), 300 grams of sodium fluoride were added, and the mixture was gelated at room temperature, the gel was dried at 100° C. for 8 hours, calcined at 500° C. for 5 hours to give a NaF-SiO$_2$ carrier (NaF content being 30% by weight).

In order to measure acidity of this carrier, when dimethyl yellow (pKa=+3.3) was added thereto, no discoloration took place, therefore, the carrier was considered to have hardly any acidity.

Said carrier was made to support an aqueous solution of cobalt nitrate by an impregnation method, further, treated with an aqueous solution of sodium carbonate, washed well with water, thereafter dried at 100° C. for 8 hours to give a basic cobalt carbonate-NaF-SiO$_2$ catalyst.

Sixty grams of the so obtained catalyst having a particle size of 6–12 mesh was reduced in a reaction tube with a hydrogen flow speed of 18 liters/hr. at 400° C. for 4 hours to prepare a Co-NaF-SiO$_2$ catalyst (Co content being 20% by weight, NaF content being 24% by weight) (weight of the catalyst after reduction being 50 grams). Using this catalyst, a reaction was carried out at a reaction temperature of 200° C. with a benzene flow speed of 4.75 grams/hr. and a hydrogen flow speed of 14.70 liters/hr., accordingly, at a hydrogen to benzene molar ratio of 10.0 for a contact period of 16.8 seconds. Conversion and yield of the produced cyclohexane were 100%. For information, with a Ni-SiO$_2$ catalyst failing to contain NaF$_2$, conversion of the cyclohexane produced under the same condition was 38.2% and after 3 hours activity of the catalyst decreased to less than half.

Example 12

Sixty grams of a Cu-NaF-SiO$_2$ catalyst (Cu content being 20% by weight, NaF content being 24% by weight) having a particle size of 6–12 mesh prepared by the method same as in Example 11 except using copper nitrate instead of cobalt nitrate was reduced as in Example 11, thereafter a reaction was carried out under the same conditions as in Example 11, and conversion and yield of the produced cyclohexane were 100%.

Example 13

Using 60 grams of a Co-MgF$_2$-SiO$_2$ catalyst (Co content being 30% by weight, MgF$_2$ content being 14% by weight) having a particle size of 6–12 mesh prepared by the similar method as in Example 11, a reaction was carried out at an average reaction temperature of 200° C. with a toluene flow speed of 5.0 grams/hr. and a hydrogen flow speed of 9.2 liters/hr., accordingly, at a hydrogen to toluene molar ratio of 7.0 for a contact period of 23.6 seconds. Conversion of the produced methylcyclohexane was 95.0% and yield thereof was 100%.

Example 14

Starting from alumina sol, using 20 grams of a Co-NaF-Al$_2$O$_3$ catalyst (Co content being 20% by weight, NaF content being 32% by weight) having a particle size of 6–12 mesh prepared by the similar method as in Example 11, when 100 cc. of benzene was reacted at a reaction temperature of 200° C. under a hydrogen pressure of 100 kg./cm.$^2$ inside an autoclave having an internal capacity of 500 cc., the reaction completed after 70 minutes, and conversion and yield of the produced cyclohexane were 100%.

Example 15

Into an aqueous solution of ferric chloride $$(FeCl_3 \cdot 6H_2O)$$

a MgF$_2$SiO$_2$ carrier prepared by the process as in Example 11 was thrown and well immersed, thereafter, excess NH$_4$OH was added to the mixed solution, thereafter washed with water until Cl$^-$ion disappeared, dried at 100° C. for 16 hours, thereafter reduction was carried out at a temperature of 360–450° C. with a hydrogen flow speed of 470–580 cc./min. for 12 hours. Using 20 grams of the so obtained catalyst Fe-MgF$_2$-SiO$_2$ (Fe content being 50% by weight, MgF$_2$ content being 10% by weight), 25 grams of xylene were dissolved in 200 cc. of cyclohexane and when a reaction was carried out at a reaction temperature of 350° C. under a hydrogen pressure of 880 kg./cm.$^2$ inside an autoclave having an internal capacity of 500 cc., the reaction completed after 105 minutes, and conversion and yield of dimethylcyclohexane were 100%.

Example 16

To 3,500 grams of silica sol (of which SiO$_2$ being 700 grams), 300 grams of barium fluoride and 300 cc. of saturated brine were added, the mixture was intensely stirred and gelated, the gel was dried at 100° C. for 8 hours, calcined at 500° C. for 5 hours to obtain a BaF$_2$-SiO$_2$-NaCl carrier (BaF$_2$:SiO$_2$:NaCl=30:70:10). Acidity of this carrier was titrated by n-butylamine with dimethyl yellow (pKa=+3.3) used as an indicator, and the acidity at acid strength Ho=3.3 was zero. Said carrier was made to support an aqueous solution of nickel nitrate by an impregnation method, further treated with an aqueous solution of sodium carbonate, washed well with water, thereafter dried at 100° C. for 8 hours to prepare a basic nickel carbonate-BaF$_2$SiO$_2$ catalyst.

Thirty grams of the so obtained catalyst were reduced at 400° C. with a hydrogen flow speed of 18 liters/hr. for 8 hours to prepare a Ni-BaF$_2$-SiO$_2$ catalyst (Ni content being 20% by weight, BaF$_2$ content being 24% by weight) (weight of the catalyst after reduction being 25 grams). Using said catalyst, a reduction was carried out at an average reaction temperature of 160° C. with a benzene flow speed of 190 grams/hr. and a hydrogen flow speed of 58.80 liters/hr., accordingly, at a hydrogen to benzene molar ratio of 10.0 for a contact period of 2.1 seconds. Conversion and yield of the product cyclohexane were 100%. Said catalyst did not display any change of activity after 100 hours. For information, with a Ni-SiO$_2$ catalyst failing to contain BaF$_2$ under the same conditions conversion of the produced cyclohexane was 30% and after 4 hours almost all the activity was lost.

Example 17

Suspending a BaF$_2$-SiO$_2$-NaCl carrier (BaF$_2$:SiO$_2$:NaCl=30:70:10)

prepared by the same process as in Example 16 into an aqueous solution of nickel nitrate, to which suspension an aqueous solution of sodium carbonate was added dropwise to have the carrier support a basic nickel carbonate. The mixture was well washed with water and shaped into cyclindrical pellets (5 x 5 mm.) at 100° C., reduced in a reaction tube to prepare a Ni-BaF$_2$-SiO$_2$ cylindrical pellet (5 x 5 mm.) catalyst (Ni content being 50% by weight, BaF$_2$ content being 15% by weight). Using 20 grams of this catalyst a reaction was carried out under the same conditions as in Example 16. Conversion and yield of the produced cyclohexane were 100%.

Example 18

Using 20 grams of a Ni-CaF$_2$-SiO$_2$ catalyst (Ni content being 20% by weight, CaF$_2$ content being 24% by weight) prepared by the same process as in Example 16 except using CaF$_2$ instead of BaF$_2$, a reaction was carried out at an average reaction temperature of 130° C. with a benzene flow speed of 17.5 grams/hr. and a hydrogen flow speed of 38.0 liters/hr., accordingly, at a hydrogen to benzene molar ratio of 7.0 for a contact period of 2.4 seconds. Conversion and yield of the produced cyclohexane were 100%.

Example 19

Using 30 grams of the same catalyst as in Example 16, a reaction was carried out at an average reaction temperature of 200° C. with a toluene flow speed of 10.0 grams/hr. and a hydrogen flow speed of 18.4 liters/hr., accordingly, at a hydrogen to toluene molar ratio of 7.0 for a contact period of 5.9 seconds. Conversion of the produced methylcyclohexane was 99.5% and yield thereof was 100%.

Example 20

Using 60 grams of a Co-BaF$_2$-SiO$_2$ catalyst (Co content being 20% by weight, BaF$_2$ content being 24% by weight) prepared by the same process as in Example 16 except using cobalt nitrate instead of nickel nitrate, a reaction was carried out at an average reaction temperature of 160° C., with a benzene flow speed of 4.75 grams/hr., and a hydrogen flow speed of 14.70 liters/hr., accordingly, at a hydrogen to benzene molar ratio of 10.0 for a contact period of 16.8 seconds. Conversion and yield of the produced cyclohexane were 100%. In this case, with a Ni-SiO$_2$ catalyst failing to contain BaF$_2$ under the same conditions, conversion of the produced cyclohexane was 42% and activity of the catalyst lowered to half after 2 hours.

Example 21

Using 10 grams of a Ni-NaF-SiO$_2$ catalyst (Ni content being 20% by weight, NaF content being 24% by weight) (pellet size: 6–12 mesh) prepared as in Example 11 except using nickel nitrate instead of cobalt nitrate, a reaction was carried out with a benzene flow speed of 85.8 grams/hr. and a hydrogen flow speed of 98.6 liters/hr., accordingly at a hydrogen to benzene molar ratio of 4.0 by varying reaction temperatures. Conversions of the produced cyclohexane were as follows.

| Reaction temp. ° C. | Conversion mol percent |
|---|---|
| 100 | 14 |
| 120 | 38 |
| 160 | 86 |
| 180 | 70 |
| 200 | 33 |
| 240 | 10 |
| 300 | 5 |
| 350 | 0 |

When the reaction temperature was 350–450° C., conversion of the produced cyclohexane was zero percent, and methane and toluene were partially brought about. For information, when benzene and hydrogen were passed at room temperature onto the catalyst (under said conditions), a reaction was gradually initiated, heating the reaction temperature, and when the reaction temperature became at least 50° C., a complete vapor-phase reaction proceeded.

Example 22

Using the same catalyst as in Example 11, conversions of cyclohexane were sought by varying the weight of the catalyst, flow speed of benzene and contact period. In order to change the contact period from 0.01 second to 4.0 seconds, the weight of the catalyst was changed from 0.2 gram to 40 grams and the benzene flow speed was changed from 7.8 cc./hr. to 30 cc./hr. The hydrogen flow speed was so changed as to make a hydrogen to benzene molar ratio 10.0.

Relationship of the contact periods with conversions of cyclohexane at a reaction temperature of 180° C. was as follows.

| Contact period (second): | Conversion of cyclohexane (mol percent) |
|---|---|
| 0.01 | 25.0 |
| 0.1 | 87.0 |
| 0.5 | 99.8 |
| 1.0 | >99.9 |
| 2.0 | >99.9 |
| 4.0 | >99.9 |

Example 23

Starting from alumina sol and strontium nitrate, using 20 grams of a Cu-SrF$_2$-Al$_2$O$_3$ catalyst (Cu content being 25% by weight, SrF$_2$ content being 30% by weight) prepared by the similar process as in Example 16, 50 cc. of benzene were reacted at 180° C. under a hydrogen pressure of 60 kg./cm.$^2$ in an autoclave having an internal capacity of 300 cc., the reaction completed after 60 minutes, and conversion and yield of the produced cyclohexane were 100%.

What is claimed is:

1. A process for the hydrogenation of the benzene ring of an aromatic compound selected from benzene and alkylbenzenes having from 7 to 15 carbon atoms which comprises contacting said aromatic compound and hydrogen with a hydrogenation catalyst at temperatures of from 50 to 300° C., said hydrogenation catalyst comprising a carrier consisting essentially of 2–80% by weight of a metal fluoride selected from the group consisting of sodium fluoride and alkaline earth metal fluorides and 12–96% by weight of an oxide selected from the group consisting of silica and alumina, and supported on said carrier, 2–60% by weight of a metal selected from the group consisting of nickel, iron cobalt and copper, all the percentages being based on the total weight of the catalyst.

2. A process for the hydrogenation of the benzene ring of an aromatic compound selected from benzene and alkylbenzenes having from 7 to 15 carbon atoms which comprises contacting said aromatic compound and hydrogen with a hydrogenation catalyst at temperatures of from 50 to 300° C., said hydrogenation catalyst comprising a carrier consisting essentially of 5–30% by weight of a metal fluoride selected from the group consisting of sodium fluoride and alkaline earth metal fluorides and 30–80% by weight of an oxide selected from the group consisting of silica and alumina, and supported on said carrier, 15–40% by weight of a metal selected from the group consisting of nickel, iron, cobalt and copper, all the percentages being based on the total weight of the catalyst.

3. A process as described in claim 1, wherein said aromatic compound is benzene.

4. A process as described in claim 1, wherein said aromatic compound is an alkylbenzene having 7–15 carbon atoms.

5. A process as described in claim 1, wherein said aromatic compound and hydrogen are contacted with said catalyst at a molar ratio of 1:3–20.

6. A process as described in claim 1, wherein said aromatic compound and hydrogen are contacted in vapor phase with said catalyst for 1–50 seconds.

References Cited

UNITED STATES PATENTS

| | | | |
|---|---|---|---|
| 3,140,925 | 7/1964 | Lindquist et al. | 252—441 |
| 3,364,151 | 1/1968 | Disegna | 252—441 |

FOREIGN PATENTS 282,782   12/1913   Germany.

DELBERT E. GANTZ, Primary Examiner

V. O'KEEFE, Assistant Examiner

U.S. Cl. X.R.

252—441, 442; 260—666

UNITED STATES PATENT OFFICE
CERTIFICATE OF CORRECTION

Patent No. 3,461,181                                    August 12, 1969

Masaki Sato et al.

It is certified that error appears in the above identified patent and that said Letters Patent are hereby corrected as shown below:

Column 2, line 33, "1.0" should read -- 1.0, S --. Column 4, line 34, "-$Al_2O$" should read -- -$Al_2O_3$ --. Column 5, line 1, after "140°" insert -- C. --. Column 6, line 52, "350° C." should read -- 250° C. --. Column 7, line 2, "a reduction" should read -- a reaction --.

Signed and sealed this 28th day of April 1970.

(SEAL)
Attest:

Edward M. Fletcher, Jr.                                WILLIAM E. SCHUYLER, JR.
Attesting Officer                                           Commissioner of Patents